(12) United States Patent
Bakke et al.

(10) Patent No.: US 11,151,102 B2
(45) Date of Patent: Oct. 19, 2021

(54) SYSTEMS AND METHODS FOR DATA MANAGEMENT USING ZERO-TOUCH TAGGING

(71) Applicant: Atavium, Inc., Plymouth, MN (US)

(72) Inventors: Mark A. Bakke, Maple Grove, MN (US); Marc David Olin, Edina, MN (US); Michael J. Klemm, Minnetonka, MN (US); Edward Fiore, Ramsey, MN (US)

(73) Assignee: Atavium, Inc., Minnetonka, MN (US)

( * ) Notice: Subject to any disclaimer, the term of this patent is extended or adjusted under 35 U.S.C. 154(b) by 234 days.

(21) Appl. No.: 15/795,882

(22) Filed: Oct. 27, 2017

(65) Prior Publication Data

US 2018/0121476 A1    May 3, 2018

Related U.S. Application Data

(60) Provisional application No. 62/414,080, filed on Oct. 28, 2016.

(51) Int. Cl.
*G06F 16/22* (2019.01)
*G06F 16/23* (2019.01)
*G06F 16/16* (2019.01)

(52) U.S. Cl.
CPC .......... *G06F 16/22* (2019.01); *G06F 16/164* (2019.01); *G06F 16/2379* (2019.01)

(58) Field of Classification Search
CPC ..... G06F 16/22; G06F 16/2379; G06F 16/164
See application file for complete search history.

(56) References Cited

U.S. PATENT DOCUMENTS 5,548,751 A    8/1996 Ryu et al.
5,557,770 A    9/1996 Bhide et al.
(Continued)

FOREIGN PATENT DOCUMENTS

EP        0446940         3/1991
WO    WO-2016077230 A1    5/2016

OTHER PUBLICATIONS

International Search Report and Written Opinion for related PCT Application No. PCT/US2017/058791 dated Jan. 12, 2018 (10 pages).

(Continued)

*Primary Examiner* — Alford W Kindred
*Assistant Examiner* — Lin Lin M Htay
(74) *Attorney, Agent, or Firm* — Schwegman Lundberg & Woessner, P.A.

(57) ABSTRACT

Systems and methods for data management using tagging rules and/or policies. The systems and methods described herein may allow users or administrators to easily label data, so as to organize the data in using any suitable terminology or parameters. Tagging rules (or tag rules) may apply or assign one or more tags to a data file or object. A tag may relate to various components of the data file or object. For example, a tag may relate to a creation date, author, size, or information within the data, such as whether the file or object includes a picture. Once the data is associated with one or more tags, policies may determine how the data is manipulated, stored, accessed, or otherwise used. Policies may relate to actions or operations to be performed with respect to data having one or more particular tags.

19 Claims, 6 Drawing Sheets

(56) References Cited

U.S. PATENT DOCUMENTS

| | | |
|---|---|---|
| 6,449,695 B1 | 9/2002 | Bereznyi et al. |
| 7,747,657 B2 | 6/2010 | Singh |
| 7,797,337 B2 | 9/2010 | Fry |
| 8,447,722 B1 * | 5/2013 | Ahuja .................... G06F 21/606 |
| | | 707/607 |
| 8,694,497 B2 | 4/2014 | Bacher et al. |
| 8,868,620 B2 | 10/2014 | Singh |
| 8,983,197 B2 | 3/2015 | Fork et al. |
| 9,134,917 B2 | 9/2015 | Kimmel et al. |
| 9,229,657 B1 | 1/2016 | Rus et al. |
| 2005/0261891 A1 | 11/2005 | Chan et al. |
| 2006/0004819 A1 | 1/2006 | Claudatos et al. |
| 2006/0265689 A1 | 11/2006 | Kuznetsov et al. |
| 2007/0226810 A1 | 9/2007 | Hotti |
| 2009/0157756 A1 | 6/2009 | Sanvido |
| 2009/0222395 A1 * | 9/2009 | Light .................... G06F 17/278 |
| | | 706/47 |
| 2009/0254336 A1 | 10/2009 | Dumais et al. |
| 2010/0274750 A1 | 10/2010 | Kalach et al. |
| 2013/0097260 A1 | 4/2013 | Lee |
| 2013/0204866 A1 * | 8/2013 | Fork .................... G06F 16/5866 |
| | | 707/723 |
| 2013/0238575 A1 | 9/2013 | Amarendran et al. |
| 2014/0068208 A1 | 3/2014 | Feldman |
| 2015/0268876 A1 * | 9/2015 | Ahn .................... G06F 3/0619 |
| | | 711/162 |
| 2016/0078245 A1 * | 3/2016 | Amarendran ....... G06F 21/6218 |
| | | 713/193 |
| 2016/0140146 A1 * | 5/2016 | Wexler .................... G06K 9/18 |
| | | 707/741 |
| 2016/0246784 A1 | 8/2016 | Chakerian et al. |

OTHER PUBLICATIONS

International Search Report and Written Opinion for related PCT Application No. PCT/US2017/058798 dated Jan. 12, 2018 (10 pages).

International Search Report and Written Opinion for related PCT Application No. PCT/US2017/058807 dated Jan. 18, 2018 (9 pages).

"European Application Serial No. 17864374.8, Extended European Search Report dated Mar. 31, 2020", 6 pgs.

"European Application Serial No. 17864374.8, Response filed Nov. 2, 2020 to Extended European Search Report dated Mar. 31, 2020", 15 pgs.

"European Application Serial No. 17864374.8, Communication Pursuant to Article 94(3) EPC dated May 3, 2021", 5 pgs.

* cited by examiner

SYSTEMS AND METHODS FOR DATA MANAGEMENT USING ZERO-TOUCH TAGGING

CROSS-REFERENCE TO RELATED APPLICATIONS

This application claims priority to U.S. Provisional Application No. 62/414,080, entitled Active Data Zero-Touch Tagging, and filed Oct. 28, 2016, the content of which is hereby incorporated by reference herein in its entirety.

FIELD OF THE INVENTION

The present disclosure relates to data handling and management. Particularly, the present disclosure relates to systems and methods for handling and managing stored data. More particularly, the present disclosure relates to systems and methods for handling and managing stored data using tags and policies.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One of the largest issues facing users of data storage systems, and particularly large data storage systems storing billions of files and objects, is the ability to manage the performance, protection, organization, accessibility, and life-cycle of the data intelligently. Data storage costs, as well as data privacy and security concerns, the growing need to maintain large quantities of data long term, and other concerns present unique problems for data handling and data storage systems. Some existing systems can be cumbersome and do not allow for ready access or maneuverability of stored data. Accordingly, there is a need in the art for improved data handling and management systems and methods. In particular, there is a need in the art for systems and methods for managing stored data in a way that allows users to manage performance, protection, organization, accessibility, and life-cycle of the data with relative ease.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a data handling system. The data handling system may have a tag rule database storing tag rules as non-transitory computer readable media. Each tag rule may define when data should be tagged. A data handling system may additionally have a policy database storing policies as non-transitory computer readable media, each policy defining when a policy operation should be performed with respect to tagged data. The data handling system may have a controller programmed with computer executable instructions for receiving data, including a data file and/or data object. The controller may additionally be programmed for comparing the received data to a tag rule to determine if the data should be tagged with a tag. Moreover, based on the comparison, the controller may tag the data by storing an association between the data and the tag. The controller may compare the tag to a policy to determine if a policy operation should be performed with respect to the data. In some embodiments, the data handling system may additionally have a mapping database storing, as non-transitory computer readable media, associations between data and tags. The data handling system may have a data storage device storing data as non-transitory computer readable media, and the controller may be programmed to store the received data on the data storage device. The controller may additionally be programmed to perform a policy operation based on the comparison of the tag to the policy. In some embodiments, the data may include metadata, and the controller may be programmed to compare the metadata to a policy to determine if a policy operation should be performed with respect to the data. In some embodiments, the tag rule compared to the received data may be a user defined tag rule. Moreover, the policy compared to the tag may be a user defined policy. The policy may relate to moving the data or storing the data in a predetermined type of storage. In some embodiments, the tag rule may be an automatically generated tag rule. The data handling system may have a natural language system in some embodiments. The natural language system may include a natural language engine and a natural language dictionary database having stored correlations between natural language and computer executable steps. The processing engine may be programmed with instructions for receiving natural language user commands and converting the user commands to computer executable steps. In some embodiments, the controller may additionally be programmed with computer executable instructions for sending at least a portion of received data to a client for additional tagging. In some embodiments, this may be performed via a webhook, message queue, or similar mechanism.

The present disclosure, in one or more embodiments, additionally relates to a method for data handling. The method may include receiving, over a wired or wireless network, data at a data ingest module via data receiving hardware circuitry, the data including a data file and/or data object. The method may include comparing the data to a stored tag rule via a tag rules engine using tag rule hardware circuitry to determine if the data should be tagged with a tag. The method may include tagging the data by storing, as non-transitory computer readable media, an association between the data and the tag. Moreover, the method may include comparing the tag to a stored policy via a policy engine using policy hardware circuitry to determine if a policy operation should be performed with respect to the data. In the some embodiments, the method may including storing the received data on a data storage device. Moreover, based on the comparison of the tag to the policy, the method may include performing the policy operation. In some embodiments, the tag rule may be a user defined tag rule, and the policy may be a user defined policy. The policy may relate to moving the data or storing the data in a predetermined type of storage.

The present disclosure, in one or more embodiments, additionally relates to a data handling system having a data ingest module, a tag rules engine, a policy engine, and a mapping database. The data ingest may have data receiving hardware circuitry for receiving a data file and/or data object. The tag rules engine may have tag rules hardware circuitry for comparing the received data to a stored tag rule to determine if the data should be tagged with a tag. The policy engine may have policy hardware circuitry for comparing the tag to a stored policy to determine if a policy operation should be performed with respect to the data. The mapping database may store, as non-transitory computer readable media, associations between data and tags. In some embodiments, the data handling system may have a natural language system including a natural language processing engine and a natural language dictionary database storing correlations between natural language and computer executable steps. The processing engine may be programmed with computer executable instructions for receiving natural language user commands and converting the user commands to computer executable steps.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous systems and methods for data management. Particularly, the present disclosure relates to novel and advantageous systems and methods for data management using tagging rules and/or policies. In general, the systems and methods described herein may allow users or administrators to easily label data, so as to organize the data in using any suitable terminology or parameters. Tagging rules (or tag rules) may apply or assign one or more tags to a data file or object. A tag may relate to various components of the data file or object. For example, a tag may relate to a creation date, author, size, or information within the data, such as whether the file or object includes a picture. Tags may be defined manually by a user or administrator, or may be created automatically by the system or partially automatically based on one or more predefined parameters. A data file or object may be assigned multiple tags for various purposes. By applying tags to the data, users may be able to more efficiently manipulate, store, or access the data. Once the data is associated with one or more tags, policies may determine how the data is manipulated, stored, accessed, or otherwise used. Policies may relate to actions or operations to be performed with respect to data having one or more particular tags. Policies may be defined manually by a user or administrator, or may be created automatically by the system or partially automatically based on one or more predefined parameters. A single data file or objet may be subject to multiple policies in some embodiments. Data management systems and methods described herein may generally help to provide appropriate and efficient protection, organization, performance, life-cycle, storage, and handling of data.

Figure 1:
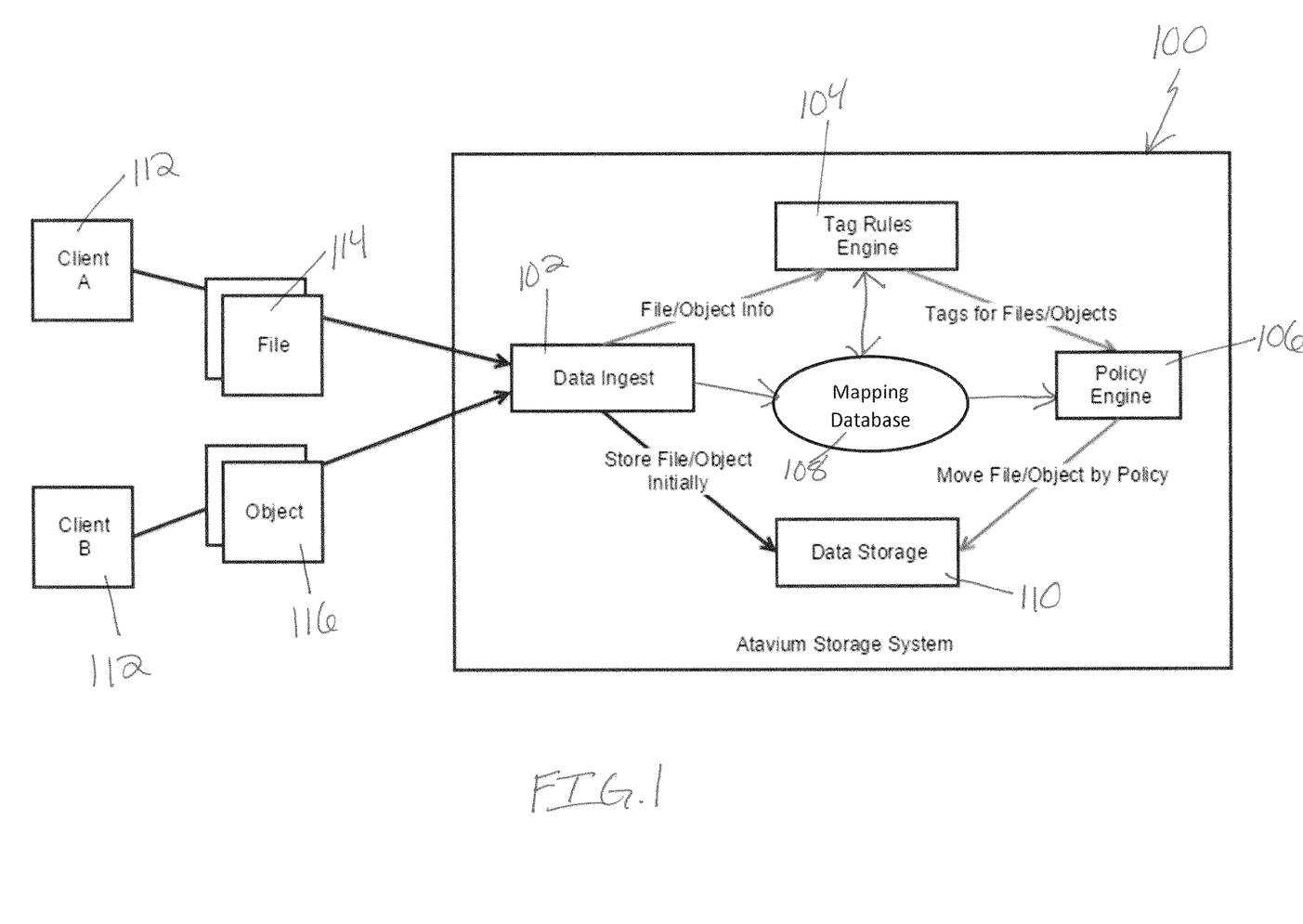
FIG. 1 is a flow diagram of a data management system of the present disclosure, according to one or more embodiments.

Turning now to FIG. 1, a data management system 100 of the present disclosure is shown, according to one or more embodiments. As shown, the system may generally include a data ingest module 102, a tag rules engine 104, a policy engine 106, a mapping database 108, and data storage 110.

The data ingest module 102 may include hardware and/or software for receiving data, including data files 114 and/or data objects 116. For example, the data ingest module 102 may receive data 114, 116 from a client or a client system. The client 112 may include a user, administrator, server, application, program, database, operating system, container, and/or other system component. The data 114, 116 may be sent by the client 112 automatically, partially automatically, or manually. For example, a client 112 may be a user who selects a particular file 114 or object 116, or batch of files or objects, to send to the data ingest module 102. In other embodiments, a client 112 system may automatically send new data writes, such as on pre-existing files or objects, to the data ingest module 102. In still other embodiments, the data ingest module 102 may send a request to the client 112 for any new data writes, such that the data ingest module may receive data writes in response to its request. The data ingest module 102 may receive the files 114 and/or object 116 in any suitable format. The data ingest module 102 may store received data in the data storage 110 in some embodiments. In some embodiments, the data ingest module 102 may receive both write and read requests. A read request may relate to data stored in the data storage. In response to a read request, the data ingest module 102 may provide access to the requested data.

The data ingest module 102 may additionally be configured to communicate or send file/object information to the tag rules engine 104 and/or mapping database 108. File/object information may be information related to or extracted from the received file 114 or object 116. In general, file/object information may include information from or about the file 114 or object 116 that may be subject to one or more tag rules. For example, file/object information may include, but is not limited to, name; path; size; extension; multipurpose internet mail extensions (MIME) type; client IP address, host name, or other identifier; user identifier; S3 metadata; network file system (NFS) attributes; server message block (SMB) access control list; NFS access control list; creation date; creation time; modification date; modification time; author; access date, access time; and/or other metadata, attributes, or information related to or extracted from the file 114 or object 116 or available from the protocol of the particular interface (i.e., NFS, SMB, HDFS, S3, Swift, or others). The data ingest module 102 may send file/object information to the tag rules engine 104 to determine whether any tag rules apply to the data 114, 116. If tag rules do apply to the data 114, 116, the data ingest module 102 may send the file/object information to the mapping database 108 for storing tag associations. In some embodiments, file/object information may include previous information, such as previous metadata, attributes, or other information related to or extracted from the file 114 or object 116, particularly if the data is a write to an existing file or object. This may help the data ingest module 102, tag rules engine 104, and/or mapping database 108 determine if any file/object information has changed.

The data ingest module 102 may include only hardware, only software, or a combination of hardware and software. For example, in some embodiments, the data ingest module 102 may include hardware, such as for example a controller, processor, hardware circuitry, and/or other hardware components described herein. Hardware circuitry may include receiving hardware circuitry, data accessing hardware circuitry, sending hardware circuitry, or other hardware circuitry. The controller, processor, hardware circuitry, and/or other hardware components may be configured to run or operate one or more software programs or applications for receiving data from and communicating data to the rules engine 104, mapping database 108, and/or data storage 110. Moreover, in some embodiments, the data ingest module 102 may be described as a layer, component, module, or element of a system. Such layer, component, module, or element may include hardware and/or software, as described above, for performing the above-described operations of the data ingest module 102.

In addition to receiving files 114 and objects 116, it is to be appreciated that the data ingest module 102 may generally receive other input/output (I/O) from clients 112 or other users. For example, the data ingest module 102 may receive a read request for data stored in the data storage 110. The data ingest module 102 may communicate with the data storage 100 to access the requested data for the read, and may make the requested data available to the user. Additionally, the data ingest module 102 may receive a write or modify request for data stored, or to be stored, in the data storage 110. The data ingest module 102 may communicate with the data storage 110 to write or modify data to the data storage. In addition to writing or modifying the data, the data ingest module 102 may send file/object information for the data to the tag rules engine 104. This process of receiving a write or modify request is described in more detail below with respect to FIG. 5. Additionally, the data ingest module 102 may receive a delete request to delete existing data in the data storage 110. In addition to deleting the relevant data from the data storage 110, the data ingest module 102 may send file/object information for the data to be deleted to the tag rules engine 104, such that tag information related to the data to be deleted may also be deleted. This may include deleting some information from the mapping database 108. In this way, the data ingest module 102 may generally receive and direct any user I/O requests related to data stored in the data storage 110.

With continued reference to FIG. 1, the tag rules engine 104 may compare file/object information received from the data ingest module 102 with one or more tag rules to determine if one or more tags should be associated with the data 114, 116. Tag rules may be, for example, if/then or similar statements that dictate data 114, 116 with particular metadata, attributes, or other file/object information should be associated with, or assigned, a particular information tag or label. As a particular example, a tag rule may dictate that all data 114, 116 received from "Client A" should be associated with, or should receive, the tag "TAG-A." Similarly, as another example, a tag rule may dictate that all data 114, 116 of the datatype "executable" should be associated with, or should receive, the tag "TAG-B." In this way, incoming data 114, 116 may be tagged or labeled into particular categories, such that it may be identified more easily and efficiently by those categories. In some embodiments, a tag rule may relate to a file/object information range. For example, a tag rule may dictate that all data 114, 116 received from a particular range of IP addresses should be associated with, or should receive, a particular tag. Similarly, a tag rule may dictate that all data 114, 116 received within a particular date range should be associated with, or should receive, a particular tag. Moreover, a tag rule may relate to various combinations of multiple types of file/object information. For example, a tag rule may dictate that all data 114, 116 received from "Client A" and received within a particular date range, should be associated with, or should receive, a particular tag. Other tag rules may relate to three, four, five, six, or more types of fields of file/object information. In this way, tag rules and tags may be relatively customizable and range from relatively easy and straightforward to relatively complex. Additionally, in some embodiments, a tag rule may apply multiple tags for particular file/object information. Below are some additional, but non-limiting, examples of tag rules:

By export type: Data ingested into a particular exported file system may be tagged.

By IP address: Data received from a particular IP address, range of IP addresses, or subnet mask may be tagged.

By user: Data created by a particular user, NFS uid, username, Active Directory, or LDAP username, or user token may be tagged.

By extension: Data with a particular extension or extension type may be tagged. For example, all data with extensions .jpg, .png, or .gif may be tagged as images.

By path: Data associated with particular directory components may be tagged with one or more tags for that path.

Tags and tag rules may be created or defined by various means. In general, tags and tag rules may be defined manually, automatically, or partially automatically. For example, a user or administrator may define particular tag rules and/or tags to be applied for those rules. In general, a user or administrator may define any desirable tag rules to apply tags based on various determinable file/object information. Tags and tag rules may be defined before data 114, 116 is received by the data ingest module 102, such that file/object information may be compared to the predefined tag rules as the data is received, or shortly thereafter. The creation of predefined tag rules may allow data to be tagged upon, or shortly after, being received or stored. Additionally, however, tag rules may be compared to data stored in the data storage 110. For example, a user may wish to apply a newly created tag rule to data already stored in the data storage 110.

In some embodiments, a user or administrator may have the ability to manually tag data. For example, a user or administrator may choose to tag a particular group of files with a tag "TAG-D." The user may select these files and associate them with TAG-D, without using a tag rule. In this way, a user may have the option to tag data files or objects without being limited to identifiable file/object information, and may thus apply any desired tag to any files or objects. The association between the data files and the TAG-D tag may be stored in the mapping database 108, for example, as if it was created via a tag rule, as described below. Manual tagging may be performed using an application program interface (API) such as a representational state transfer (REST) API in some embodiments.

In some embodiments, tags and/or tag rules may be created or defined by multiple users. For example, in some embodiments, role-based access control may be used to permit particular users or administrators rights for adding, removing, or modifying tags associated with data. In some embodiments, multiple users may be permitted to propose data tags, and one or more administrative users may be permitted to confirm proposed data tags. In some embodiments, tag creation or proposal may be outsourced, such as to other entities or companies, or may be performed via crowd sourcing. This may be particularly beneficial where a large number of files and/or objects needs tagging. In some embodiments, users or others proposing or creating tags may be granted different views or access rights. For example, users tasked with proposing or assigning tags may be permitted to view only structured information about the underlying data, but not the data itself. In other embodiments, the users may be permitted to view only a portion of the underlying data. This may be beneficial where the data may be proprietary or voluminous.

In some embodiments, tags and/or tag rules may be automatically generated or proposed by the tag rules engine 104 or another component of the system 100. For example, the tag rules engine 104 may automatically generate and assign tags as file/object information for data 114, 116 is received and reviewed. For example, automatic tags may relate to age of the data, file name extensions, file data headers, file data checks, users, clients, and sources of the data. Below are some examples of types of tags that may be automatically generated based on file/object information.

Tags based on date information
    Age in months
    Age in weeks
    Age in days
    Creation date
    Creation year
    Creation month
    Creation day
    Modify date
    Access date
Tags based on file name extensions
    MIME-TYPE
Tags based on headers
    DATA-MIME-TYPE
    EXECUTABLE
    DOCUMENT
Tags based on file data checks (checksums, formats, etc.)
    DATA-FORMAT-OK
    DATA-FORMAT-INVALID (e.g., a tar.gz file has errors)
    DATA-HASH-INVALID (e.g., the file data does not match a stored hash)
Tags based on user or author information
    Creation user (the user who created the data)
    Access user (users who have accessed the data)
    Modify user (users who have modified the data)
Tags based on client information
    Creation client (the client who created the data)
    Access client (clients who have accessed the data)
    Modify client (clients who have modified the data)
Tags based on source information
    Application cluster identities
    IP addresses
    Host names
    Subnets and IP ranges In some embodiments, automatically generated tags may be based on metadata or other file 114 or object 116 attributes. In other embodiments, metadata may be used instead of, or in addition to, tags. In some embodiments, tags may be automatically generated based on use. For example, where a user often accesses data with a particular attribute or tag, a tag may be automatically generated to identify the data as frequently accessed.

In some embodiments, a webhook, message queue, or other application or program may allow for additional or alternative data tagging. For example, a webhook may be used to send a client's data, or a portion of the client's data from the system back to the client for additional or alternative tagging. In one particular example, data that may be sensitive or private, such as HIPAA data or other secure company data, may be tagged separately by the client using the webhook. The tagged data may then be returned to the system for application of policies via the policy engine. As another example, a security application may tag data as "quarantine data," indicating the data may have a security concern and/or should be subject to additional review. In general, the webhook may allow a client or other user to tag their own data, or tag data independently from other systems.

In some embodiments, tag rules may be stored in the mapping database 108. In other embodiments, tag rules may be stored in another database or another location. For example, tag rules may be stored on tag rule engine 104 hardware.

To determine if a particular data file 114 or object 116 should receive, or be associated with, one or more tags, the tag rule engine 104 may compare the file/object information for the data with predefined tag rules. If the tag rule engine 104 determines that a data file 114 or object 116 satisfies one or more tag rules, and thus should be associated with one or more tags, the tag rule engine may "tag" the data. Tagging the data may include storing an association between a tag and the data file or object in, for example, the mapping database 108. In other embodiments, tagging the data may include appending one or more tags to the data stored in the data storage 110. In still other embodiments, the tag rules engine 104 may employ other methods of tagging the data.

Figure 2:
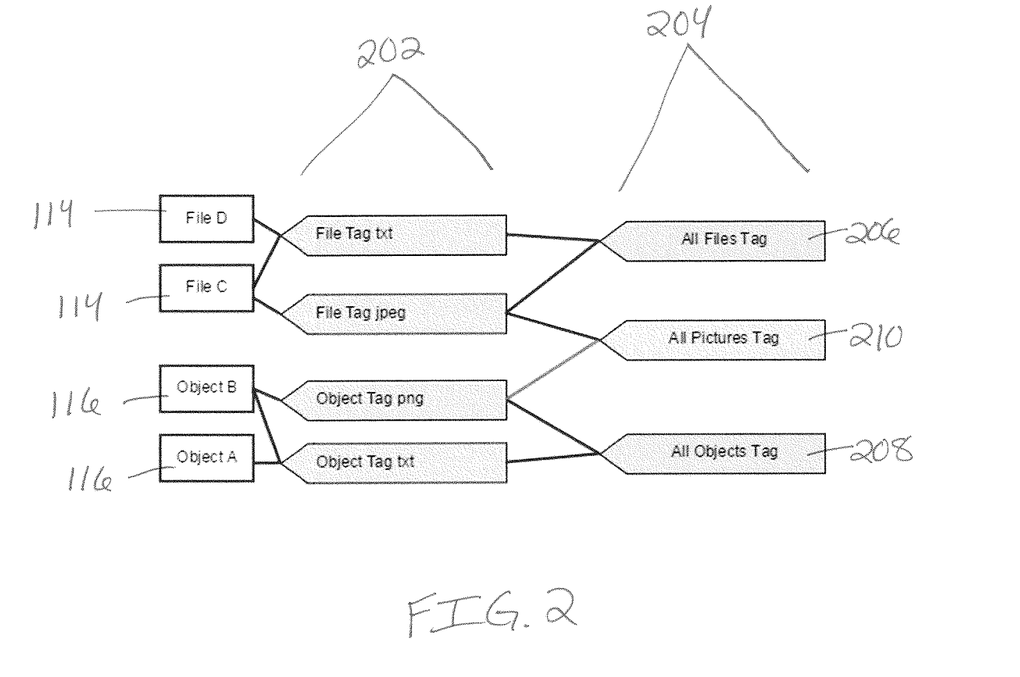
FIG. 2 is a conceptual diagram of hierarchical tag associations that may be stored in the mapping database, according to one or more embodiments.

In some embodiments, tags may be generated and/or assigned hierarchically, such that tags may be assigned to other tags. This may be particularly beneficial with a large number of data files 114 or objects 116. For example, while a user or administrator may apply or define a variety of simple or high level tags, more complex and/or more flexible tags may also be defined and/or maintained in the system 100 and assigned hierarchically. FIG. 2 shows one embodiment of a hierarchical tagging structure. As shown, files 114 and objects 116 may be assigned a first level of tags. The first level 202 or tier of tags may be tagged by a second level 204 or tier of tags, which may categorize the data differently, more broadly, or more narrowly than the first level of tags. In some embodiments, the second level 204 of tags may be generated manually, automatically, or partially automatically.

FIG. 2 illustrates an example of how hierarchical tags may be used flexibly. For example, the first level 202 of tags shown in FIG. 2 may be generated automatically based on data type. In general, these data type tags may remain unchanged once determined, because the data type is unlikely to change. The second level 204 of tags may be used to categorize the first level 202 of tags. For example, an "All Files" tag 206 may apply to all files, an "All Objects" tag 208 may apply to all objects, and an "All Pictures" tag 210 may be used to identify all data (files or objects) that contain pictures.

Figure 3A:
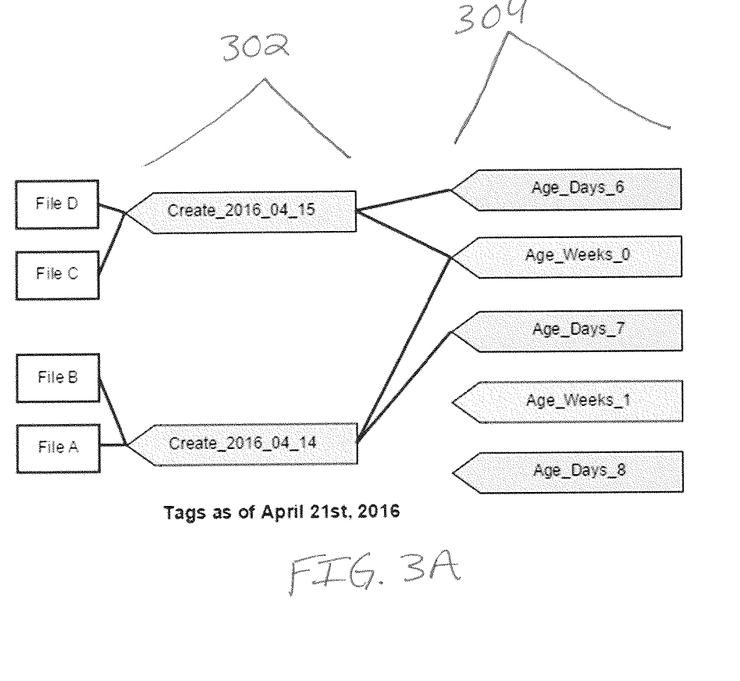
FIG. 3A is a conceptual diagram of age tag associations that may be stored in the mapping database, according to one or more embodiments.
Figure 3B:
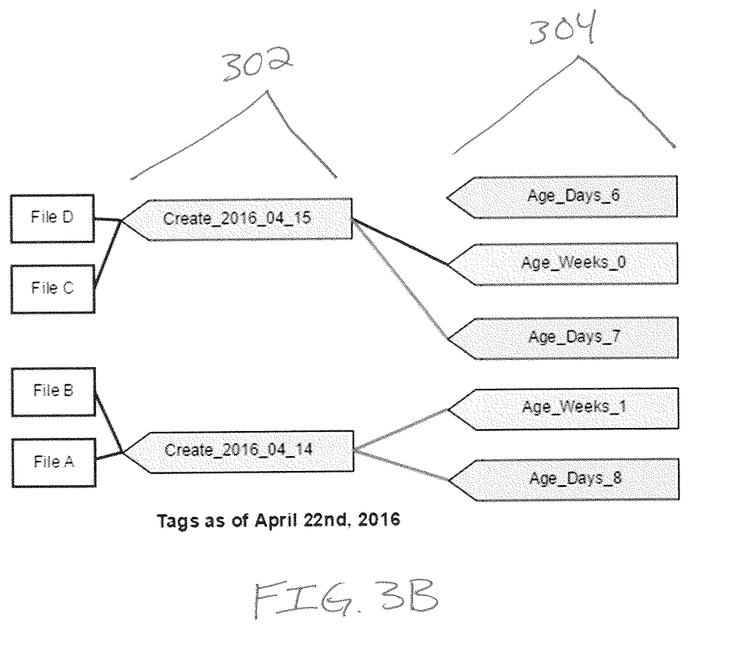
FIG. 3B is another conceptual diagram of age tag associations that may be stored in the mapping database, according to one or more embodiments.

Another example of hierarchical tags is data age tagging. Often, operations performed with stored data relate to the age of the data. For example, a user may wish to maintain active data for three years, then move the data to archive, and then delete the data after five years. Or a user may wish to view all data that is less than a week old. However, tagging based on age poses a particular problem—the age is always changing based on the current date. For example, if a user wishes to identify data age on a granularity level of days, the age of each file will change daily. FIGS. 3A and 3B show an example of the use of hierarchical tagging for identifying data age. As shown in FIG. 3A, a first level 302 or tier of tags identifies data creation dates. Files A and B, created on Apr. 14, 2016, are tagged with their creation date. Similarly, Files C and D are tagged with their creation date of Apr. 15, 2016. These first level 302 creation date tags may be generated automatically or may be applied based on comparison with a tag rule. The first level 302 of tags may generally remain unchanged, as the creation date of the data is unlikely to change. A second level 304 or tier of tags may be used to tag the creation dates with an age, which may change. As shown in FIG. 3A, day granularity and week granularity tags may be used, for example. As shown in FIG. 3A, as of Apr. 21, 2016, Files A, B, C, and D, are all 0 weeks old (0-6 days), and the tag "Age_Weeks_0" is applied to both creation date tags. Any action taken for data that is less than or equal to one week old would include Files A, B, C, and D. Additionally, the creation date tags for Files A and B may be tagged with "Age_Days_7," and the creation date tags for Files C and D may be tagged with "Age_Days_6." Any action taken for data that is exactly 6 days old would include Files C and D, and any action taken for data that is exactly 7 days old would include Files A and B. As shown in FIG. 3B, on the following day of Apr. 22, 2016, the age tag associations may change, because the data is now one day older. While the creation date tags may not change, associations with the more flexible second level 304 of tags related to age may be modified. In particular, while the creation date tag for Files C and D may be unchanged, the creation date tag may be tagged with the Age_Days_7 tag. The Age_Days_6 tag may be removed from, or disassociated with, the creation date tag for Files C and D. The creation date tag for Files C and D may continue to be associated with the Age_Weeks_0 tag. Additionally, while the creation date tag for Files A and B may be unchanged, the creation date tag may be tagged with an "Age_Days_8" tag, as well as an "Age-Weeks_1" tag. The Age_Days_7 and Age_Weeks_0 tags may be removed from, or disassociated with, the creation date tag for Files A and B. These age tag associations may update automatically from day to day, week to week, month to month, or otherwise based on the lowest granularity tagged. In this way, instead of changing individual age tags for every file in the system, only a smaller number of tag associations need be updated to maintain age tags.

In some embodiments, data tagging may be used to determine or track where data was initially created, where it was copied from, and in some cases, may allow recovery from the original source. A data source may be a user, a client, an application, a cluster, a machine, or another source. Sources may be hierarchical and/or geographical. In some embodiments, source discovery for a data file or object may include examination of hosts that write to a same file, directory, or file system. Source discovery may further include examination of the hosts that read a same file. This may be performed by examining the host tags, path tags, and other tags for the data. Tags related to IP addresses and host identifiers for creation, and IP addresses and host identifiers for users accessing the data may additionally be used in determining a source for a data file or object. In some embodiments, an access map may be created to organize and compare this data. Correlations and patterns may be found to determine groups of addresses that frequently read and/or write a set of files. Information from clusters or plugins, for example, may be used to validate this information. In some embodiments, correlation algorithms may be used to determine groups of addresses or users that frequently read and/or write a set of files to help identify source.

The tag rules engine 104 may include only hardware, only software, or a combination of hardware and software. For example, in some embodiments, the tag rules engine 104 may include hardware, such as for example a controller, processor, hardware circuitry, and/or other hardware components described herein. Hardware circuitry may include receiving hardware circuitry, data accessing hardware circuitry, sending hardware circuitry, tagging hardware circuitry, tag rule application hardware circuitry, or other hardware circuitry. The controller, processor, hardware circuitry, and/or other hardware components may be configured to run or operate one or more software programs or applications for receiving data from and communicating data to the data ingest module 102, mapping database 108, and/or policy engine 106. Moreover, in some embodiments, the tag rules engine 104 may be described as a layer, component, module, or element of a system. Such layer, component, module, or element may include hardware and/or software, as described above, for performing the above-described operations of the tag rules engine 104.

With reference back to FIG. 1, the mapping database 108 may store associations between data files 114 and/or objects 116 and tags. That is, if it is determined that a data file 114, for example, should be associated with, or should receive, a particular tag, such as TAG-A, the mapping database 108 may store an association between that data file and TAG-A. If the data file 114 is associated with other tags, the mapping database 108 may additionally store relationships or associations between the data file and those tags as well. In this way, while the data itself may be stored in the data storage 110, the mapping database 108 may store data-tag associations. FIGS. 2 and 3, described above, show some examples of data-tag associations that may be stored in the mapping database 108.

The tag rules engine 104 may notify the policy engine 106 of tags related to data and/or file/object information. In some embodiments, the tag rules engine 104 and/or mapping database 108 may additionally direct tagging information to a tag statistics engine, as described in U.S. patent application entitled Systems and Methods for Viewing and Accessing Data Using Tagging, filed the same day as the present application on Oct. 27, 2017, and having U.S. patent application Ser. No. 15/795,961, the content of which is hereby incorporated by reference herein in its entirety.

The policy engine 106 may receive tag information from the tag rules engine 104 and/or mapping database 108. Information may be sent to, and received by, the policy engine 106 in any suitable format. The policy engine 106 may be configured to apply one or more policies to the data based on the tags associated with the data. A policy may provide for viewing, storing, accessing, moving, deleting, copying, identifying, protecting, securing, or otherwise manipulating or using the data based on tagging. For example, a policy may include moving all data with a particular tag to a particular storage location at a particular time. Similarly, a policy may include displaying all data with a particular tag and a particular creation date range. Policies may be, for example, if/then or similar statements dictating that particular operations should be performed with respect to data having particular tags, metadata, and/or other attributes. Policies may be defined by a user or administrator. Policies may be predefined or may be defined as needed or on demand. In some embodiments, policies may be generated or proposed automatically. Policies may include more than one tag, including manual tags, and/or tags based on metadata or other file/object information. Where two or more policies conflict or result in different operations, predetermined rules may help to resolve the conflict. For example, rules may dictate that particular types of policies, or policies resulting in particular operations may outweigh other conflicting policies.

The policy engine 106 may include only hardware, only software, or a combination of hardware and software. For example, in some embodiments, the policy engine may include hardware, such as for example a controller, processor, hardware circuitry, and/or other hardware components described herein. Hardware circuitry may include receiving hardware circuitry, data accessing hardware circuitry, sending hardware circuitry, policy hardware circuitry, or other hardware circuitry. The controller, processor, hardware circuitry, and/or other hardware components may be configured to run or operate one or more software programs or applications for receiving data from and communicating data to the tag rules engine 102, mapping database 108, and/or data storage 110. Moreover, in some embodiments, the policy engine 106 may be described as a layer, component, module, or element of a system. Such layer, component, module, or element may include hardware and/or software, as described above, for performing the above-described operations of the policy engine 106.

The data storage 110 may store data accessible by the data ingest module 102 and/or policy engine 106. The data storage 110 may include random access storage, flash storage, and/or other suitable storage types. The data storage 110 may include more than one database in some embodiments. Moreover, the data storage 110 may include local and/or remote databases. In some embodiments, the data storage 110 may include cloud storage drives. In some embodiments, the data storage 110 may relate to a particular client or user. In some embodiments, the data storage 110 may be provided or owned by a particular client or user. However, in other embodiments, the data storage 110 may store data related to more than one client or user. In some embodiments, data may be stored in the data storage 110 in accordance with the systems and methods described in U.S. patent application entitled Systems and Methods for Random to Sequential Storage Mapping, filed the same day as the present application on Oct. 27, 2017, and having U.S. patent application Ser. No. 15/796,234, the content of which is hereby incorporated by reference herein in its entirety.

The data storage 110 may include hardware and/or software. For example, in some embodiments, the data storage 110 may include hardware, such as for example a controller, processor, storage hardware circuitry, and/or other hardware components described herein. The controller, processor, hardware circuitry, and/or other hardware components may be configured to run or operate one or more software programs or applications for receiving data from the data ingest module 102, providing data to the data ingest module and/or policy engine 106, and/or providing client access to the data.

Figure 4:
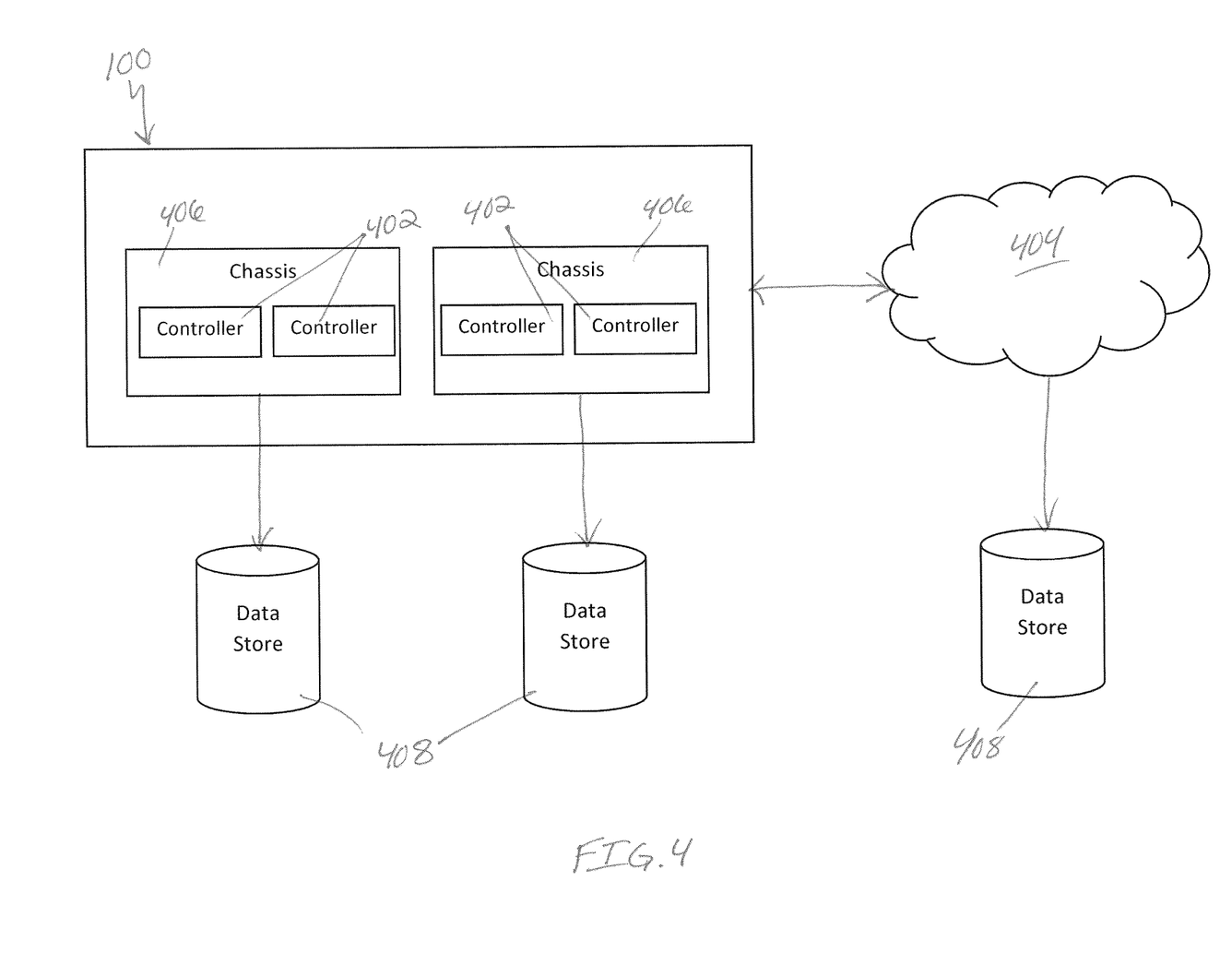
FIG. 4 is a hardware diagram of a data management system of the present disclosure, according to one or more embodiments.

FIG. 4 shows a hardware diagram of the data management system 100, according to one or more embodiments. In general, software for the data ingest module 102, tag rules engine 104, policy engine 106, mapping database 108, and/or other components of the system 100 may operate on one or more controllers 402 and/or on a cloud based system 404. The one or more controllers 402 may be arranged on one or more chassis 406, for example. The controllers 402 and/or cloud system 404 may communicate over a wired or wireless network with one or more data storage devices 408. The data storage device(s) 408 may include the data storage described above with respect to FIG. 1. The data storage device(s) 408 may include RAM memory, flash memory, and/or any other suitable memory devices or types. In some embodiments, the one or more controllers 402 and the cloud system 404 may communicate with one another over a wired or wireless network. In some embodiments, portions of the system 100 may be run or executed using the controllers 402, for example, while portions of the system may be run or executed using the cloud system 404.

More generally, the system 100 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, the system 100 or any portion thereof may be a minicomputer, mainframe computer, personal computer (e.g., desktop or laptop), tablet computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. The system 100 may include volatile memory (e.g., random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of the system 100 may include, in addition to or alternative to the data storage devices, one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. The system 100 may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system 100 may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

The system 100 may also generally include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, etc.) using any of a variety of commercially available bus architectures.

One or more programs or applications, such as a web browser and/or other executable applications, may be stored in one or more of the system data storage devices. For example, the data ingest module 102, tag rules engine 104, and policy engine 106 may be or include programs or applications stored in, and configured to run or execute on, the system 100. Generally, programs may include routines, methods, data structures, other software components, etc., that perform particular tasks or implement particular abstract data types. Programs or applications may be loaded in part or in whole into a main memory or processor during execution by the processor. One or more processors or controllers may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

The system 100 may operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hotspot, a global communications network, such as the Internet, and so on. The system 100 may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices. In some embodiments, some or all of the components, applications, or programs of the system 100 or any system of the present disclosure may be provided as cloud-based components, or may be otherwise provided by, executed on, or supported by, a cloud system.

Figure 5:
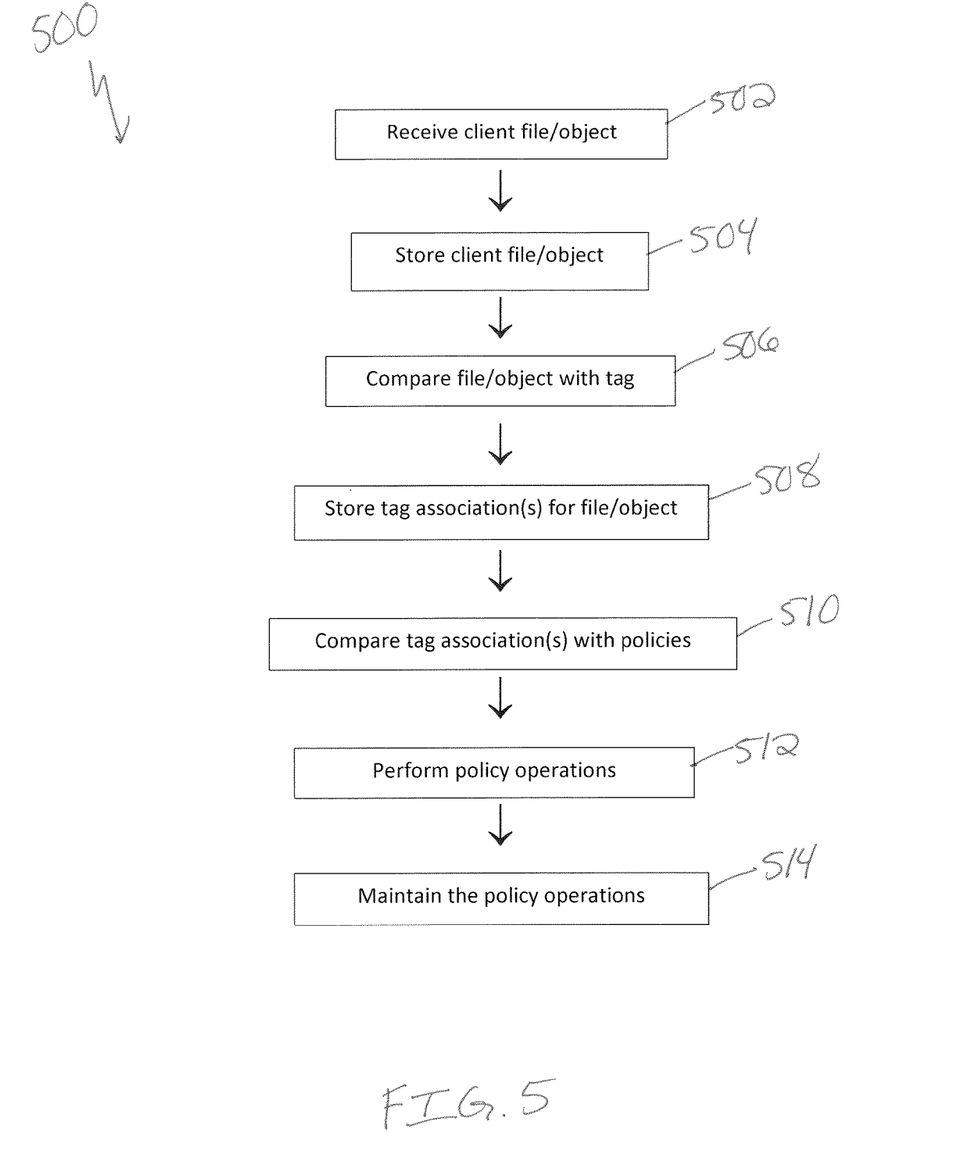
FIG. 5 is a flow diagram of a method for data management of the present disclosure, according to one or more embodiments.

FIG. 5 shows a method 500 of data management that may be performed using hardware and/or software of the system 100 according to various embodiments of the present disclosure. As shown, the method 500 may include the steps of receiving a data file or data object 502; storing the data file or data object 504; comparing the data file or data object with tag rules to determine tag association(s) 506; storing tag association(s) for the data file or data object 508; comparing the tag association(s) with policies 510; performing the policy operations 512; and maintaining the policy operations 514. In other embodiments, the method 500 may include additional and/or alternative steps.

Receiving a data file or data object 502 may include receiving data via a data ingest module or other data receiving module or layer. As described above with respect to the data ingest module, the data may be received in any suitable format. Upon receipt, the data file or object may be stored in a data storage or other suitable database or storage location 504. The data may be stored according to any suitable storage scheme. In some embodiments, the step of comparing the data file or data object with tag rules 506 may be performed simultaneously with storing the data 504, or before or after storing the data. Comparing the data with tag rules 506 may be performed by a tag rules engine. As described above, file or object information, such as metadata and/or other information about the data may be compared to predefined tag rules. Based on the comparing, the tag rules engine, or another module or layer, may determine that one or more tags should be associated with the data file or object. Associations between the data and the one or more applicable tags may be stored in, for example, the mapping database 508. However, in other embodiments, tags that apply to the data may be appended to and/or stored with the data. The method 500 may additionally include comparing the tag association(s) with policies to determine if any policies, such as storage policies, display policies, or others, apply to the data 510. Based on the comparison, if it is determined that one or more policies apply to the data via the associated tags, the policy operations may be performed with respect to the data 512.

Moreover, one or more policy operations may be maintained 514. Maintaining policy operations may include performing additional operations, such as where a policy requires continuous or repeated operations or requirements. Maintaining policy operations may additionally include revising operations or requirements in response to policy modifications. That is, where a policy is modified, maintaining policy operations may include ensuring that updated or revised operations are performed with respect to previously tagged data. Additionally, in some embodiments, the tag association(s) for the data may be compared with policies 510 more than once, such as at intervals, intermittently, or on demand, as policies and/or tagging may change.

Figure 6:
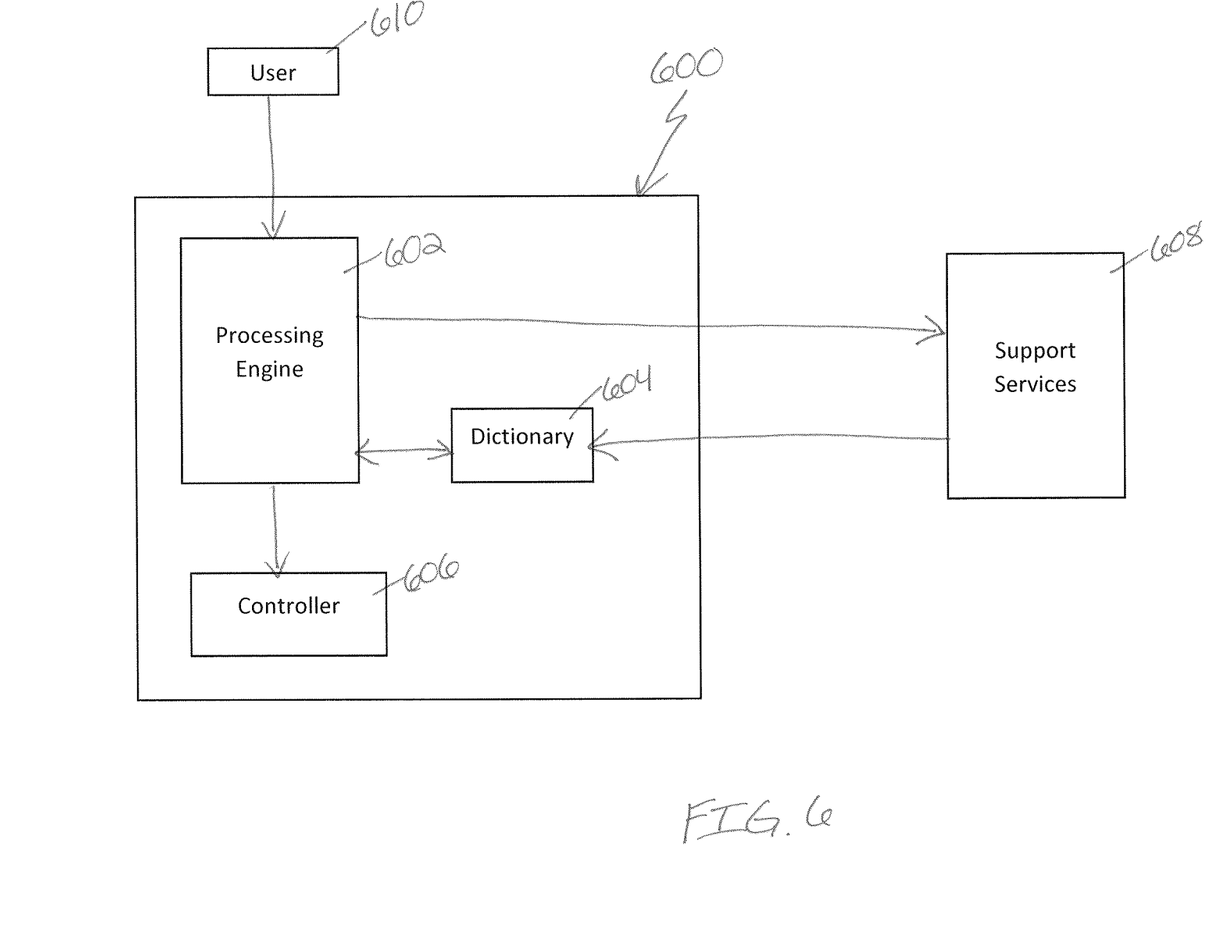
FIG. 6 is a diagram of a natural language system of the present disclosure, according to one or more embodiments.

In some embodiments, a system of the present disclosure may be configured to allow for tags, tag rules, and/or policies to be defined using natural language. That is, a system of the present disclosure may be configured to receive user commands for defining a tag, a tag rule, or a policy in natural language, and automatically convert those commands to computer readable instructions needed to carry out the user's natural language commands. For example, FIG. 6 shows one embodiment of a natural language system 600 that may be included in, or used in conjunction with, systems and methods of the present disclosure. In some embodiments, the natural language system 600 may have a processing engine 602, a dictionary 604, and a controller 606. Additionally, support services 608 may provide local or remote support for the natural language system.

The processing engine 602 may be configured to receive natural language commands from a user 610. The user 610 may enter the commands at a user interface, for example. In some embodiments, the user 610 may say or speak the natural language commands, such as via a smartphone or other voice command system. The commands may relate to defining tags, tag rules, and/or policies. Moreover, the processing engine 602 may be configured to convert the natural language commands to computer readable and executable processing steps needed to carry out the commands. In some embodiments, one natural language command may convert into multiple computer executable processing steps. Below are some examples of natural language commands, and corresponding processing steps to carry out the commands.

| Natural Language Command | Example of Computer Executable Steps to Accomplish Command |
|---|---|
| Move all Marketing data to the cloud | 1. Find the tag named "Marketing"<br>2. Find a policy that has Data Placement as Cloud. If not found, create policy that has Data Placement as Cloud.<br>3. Determine if the "Marketing" tag already has a Data Placement policy. If it does, remove the old Data Placement policy.<br>4. Set the Data Placement policy of the "Marketing" tag to the Cloud. |
| Apply tag of "Large File" to all files that are over 1 GB | 1. Find the tag named "Large File." If not found, create tag named "Large File."<br>2. Write a custom script to:<br>  a. Get all files.<br>  b. Go through all files for files greater than 1 GB.<br>    i. Tag with "Large File" tag. |

Based on the natural language command, the processing engine 602 may determine what action(s) the user 610 desires to invoke, and parse the natural language for names of entities on the system to invoke those actions. If the processing engine 602 cannot determine the desired action(s), the processing engine may return an error message in some embodiments. In some embodiments, the processing engine 602 may suggest possible actions to the user 610.

The processing engine 602 may determine the desired actions(s) and convert the natural language to executable steps using the dictionary 604. The dictionary 604 may store known natural language commands, terms, or phrases, and their corresponding executable steps. For example, the phrase "apply tag" may translate in the dictionary to the steps of determining if the particular tag to be applied already exists; if not, creating the tag; and tagging the particular data with the tag. The processing engine 602 may use the dictionary 604 to identify key words and phrases to determine the user's desired action(s). Below are some examples of key words and their corresponding actions, which may be stored in the dictionary 604.

| Key Words | Action |
|---|---|
| Move, Put, Place | Change Data Placement Policy |
| Prioritize | Change Data Priority Policy |
| Encrypt, Secure | Turn on Encryption |

By identifying the key words stored in the dictionary 604, the processing engine 602 may generally ignore other words in the user's natural language command. Below are some examples of natural language commands that may each seek to accomplish the same action.

"Move all Marketing data to the Cloud.
The Cloud is the place for all Marketing data.
The Cloud is for irrelevant information. Move all things tagged with Marketing there.
Um . . . could you please, when you get a chance, put all Marketing stuff in the Cloud . . . Thanks!

Each of the above example natural language commands may result in data tagged with "Marketing" being moved to Cloud storage. The processing engine 602 may identify the key words of move, place, and put to determine that the action desired is to relocate data. The processing engine 602 may analyze the remaining language of the commands to determine that the data to be moved is data tagged as "Marketing," and the place to move the data is the Cloud storage. The processing engine 602 may combine this information to develop executable steps.

Once the processing engine 602 determines the executable steps needed to perform the user's command, the processing engine may send the executable steps to the controller 606 for execution. However, before sending the steps, in some embodiments, the processing engine 602 may determine if the steps are permissible and/or valid via a verification process. The verification process may compare the executable steps to existing tags, tag rules, policies, or other rules or policies of the system to determine if the executable steps will violate any existing elements. If the processing engine 602 determines that the executable steps will violate an existing rule, policy, or other element of the system, the processing engine may return an error message. The error message may include the particular rule or policy violation in some embodiments. If the executable instructions do not violate any rule, policy, or other element, the processing engine 602 may send the executable steps to the controller 606.

In some embodiments, the controller 606 may be or include one of the system controllers described above with respect to FIG. 4. The controller 606 may communicate with the tag rules engine, policy engine, mapping database, data storage, and/or other components of the system, as described above, in order to execute the executable steps.

In some embodiments, support services 608 may provide local or remote support for the natural language system 600. Support services 608 may be provided via a cloud system, for example, and may communicate with the natural language system 600 over a wired or wireless network. The support services 608 may receive natural language commands that have been entered by the user 610. Additionally, the support services 608 may receive information about the commands, such as how the commands were parsed or analyzed by the processing engine, any errors related to the commands, the executable steps that were developed from the commands, and whether the executable steps were executed. In some embodiments, this information may be sent automatically to the support services 608 by, for example, the processing engine 602. In other embodiments, the support services 608 may request information from the processing engine 602. In some embodiments, the user 610 may have the option to send feedback, questions, or problems to the support services 608 related to the user's use of the natural language system 600. In some embodiments, the support services 608 may track and/or analyze user commands to determine, for example, what phrases, terms, and actions are most commonly used; what phrases, terms, and action users are having the most success with; and what phrases, terms, and actions users are having the most difficulty with. In some embodiments, the support services 608, the processing engine 602, and/or the dictionary 604 may incorporate machine learning abilities.

In some embodiments, the support services 608 may analyze user commands to develop new or different dictionary entries. The support services 608 may additionally be configured to update or revise the dictionary 604. In some embodiments, the support services 608 may connect with and update the dictionary 604 automatically. In this way, the dictionary 604 may be updated in real-time or substantially real-time. In some embodiments, some dictionaries or dictionary entries may be updated automatically, while others may be updated manually, partially automatically, or after some delay or review. For example, some dictionary entries determined by the support services 608 may relate to only particular client dictionaries, or may include proprietary definitions, such that only particular dictionaries may receive the updated entries. Moreover, some clients or client dictionaries may be permitted earlier access to new dictionary entries.

Each of the processing engine 602, dictionary 604, controller 606, and support services 608 may include only hardware, only software, or a combination of hardware and software. For example, in some embodiments, the processing engine 602, dictionary 604, controller 606, and/or support services 608 may include hardware, such as for example a controller, processor, hardware circuitry, and/or other hardware components described herein. Hardware circuitry may include receiving hardware circuitry, data accessing hardware circuitry, sending hardware circuitry, or other hardware circuitry. The processing engine 602 may have language converting hardware circuitry, for example. The controller 606 may have step execution or command execution hardware circuitry. The support services 608 may have command analysis or language analysis hardware circuitry. The support services 608 may additionally or alternatively have dictionary updating hardware circuitry. The various controllers, processors, hardware circuitry, and/or other hardware components of the processing engine 602, dictionary 604, controller 606, and support services 608 may be configured to run or operate one or more software programs or applications for receiving user commands, parsing and converting user commands, executing user commands, analyzing user commands, and updating dictionary entries. Moreover, in some embodiments, any of the processing engine 602, dictionary 604, or support services 608 may be described as a layer, component, module, or element of a system. Such layer, component, module, or element may include hardware and/or software, as described above, for performing the above-described operations.

Systems and methods of the present disclosure may generally provide improved data management. The tags, tag rules, and policies described herein may allow for more organized data storage and maintenance, such that data may be easily recalled, viewed, accessed, or otherwise manipulated or used. Moreover, the systems and methods described herein may provide for more efficient data storage, as particular types of data, more or less important data, or data having higher or lower access rates, for example, may be more easily identified and moved. In general, the system and methods described herein may allow for data to be easily moved, manipulated, or used based on one or more attributes of the data. The systems and methods described herein may be particularly beneficial with respect to a large data storage system having a high volume of stored data files and/or objects.

Moreover, the systems and methods described herein may allow users or clients to organize, label, or store their data using any desired categories or naming schemes. That is, the systems and methods described herein may allow users or clients to create custom tags, tag rules, and policies for data as desired. Further, by providing for application of tag rules and policies of the data upon ingest into the systems described herein, the data may be easily and efficiently categorized as soon as it enters the system, or shortly thereafter. In this way, the life cycle of the data may be determined and tracked, and the data may be easily accessible, as soon as it enters the system or shortly thereafter. This may allow users or clients to track and control large numbers of files or objects without the need to manually individually label, categorize, or otherwise handle each individual data item. Moreover, the natural language systems described herein may allow users and clients to easily control the handling of their data without the need to use complex programming language or instructions. Users and clients may easily and plainly state their desired commands for handling and manipulating their data. Additionally, the systems and methods described herein may be implemented with existing data storage systems, and may generally use a client's existing databases.

One particular example of how methods and systems described herein may be useful or beneficial to a user may relate to the need to recall data stored on relatively slow or less expensive storage. For example, where a user runs reports on a portion or portions of a data set periodically, the report process may be particularly slow or cumbersome where some or all of the data has been stored on less expensive data storage devices. However, maintaining the data in faster or more expensive storage devices, such as flash storage devices, may be too expensive, particularly where the data is only accessed periodically. Accordingly, systems and methods of the present disclosure may be used to tag the data used in the periodic reporting. A policy may be created that moves the data, based on this tag, to more expensive or faster storage for a day, or another period of time, in anticipation of the periodic report cycle. The policy may further establish that the data is moved back to less expensive storage after the reporting is complete. In this way, the systems and methods described herein may use tagging and policies to move data to more or less expensive storage devices as needed, so as to ensure fast processing times and access when needed, but to otherwise maintain data in less expensive storage when not being used.

Similarly, as another particular example, systems and methods described herein may allow for on-demand policies, such that data may be moved to faster or more expensive storage as needed. For example, with respect to a tiered storage system, where infrequently accessed data is migrated to less expensive storage devices, if a user needs to access data on those less expensive device tiers, the user may define a policy on demand to move data with one or more particular tags to a faster storage tier.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, Python, Go, JavaScript, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A data handling system comprising:
   a tag rule database storing tag rules on non-transitory computer readable media, each tag rule defining when data should be tagged;
   a policy database storing policies on non-transitory computer readable media, each policy defining when a policy operation should be performed with respect to tagged data;
   a controller programmed with computer executable instructions for:
      receiving data comprising at least one of a data file and a data object;
      comparing the received data to a tag rule to determine if the data should be tagged with a tag;
      based on the comparison, tagging the data by storing an association between the data and the tag; and
      comparing the tag to a policy to determine if a policy operation should be performed with respect to the data, wherein the policy operation causes data associated with the tag to be moved from a slow storage device to a faster storage device for a period of time, and then moved back to the slow storage device after the period of time expires;
      identifying when an updated policy is stored to the policy database, the updated policy having a corresponding updated policy operation;
      identifying, by referencing a mapping database, data corresponding to the tag, the mapping database storing, on non-transitory computer readable media, the association between the data and the tag;
      performing the updated policy operation on the data corresponding to the tag;
      sending at least a portion of received data to a client for additional tagging, the client separate from the data handling system;
      receiving the portion of received data from the client with additional tagging; and
      comparing the additional tagging to a second policy to determine if a second policy operation should be performed with respect to the portion of received data.

2. The data handling system of claim 1, further comprising a data storage device storing data on non-transitory computer readable media.

3. The data handling system of claim 2, wherein the controller is further programmed with computer executable instructions for storing the received data on the data storage device.

4. The data handling system of claim 1, wherein the controller is further programmed with computer executable instructions for, based on the comparison of the tag to the policy, performing the policy operation.

5. The data handling system of claim 1, wherein the data comprises metadata, and the controller is additionally programmed with computer executable instructions for comparing the metadata to a policy to determine if a policy operation should be performed with respect to the data.

6. The data handling system of claim 1, wherein the tag rule is a user defined tag rule.

7. The data handling system of claim 1, wherein the policy is a user defined policy.

8. The data handling system of claim 7, wherein the policy relates to at least one of moving the data and storing the data in a predetermined type of storage.

9. The data handling system of claim 1, wherein the tag rule is an automatically generated tag rule.

10. The data handling system of claim 1, further comprising a natural language system comprising:
    a natural language processing engine programmed with computer executable instructions for:
    receiving natural language user commands; and
    converting the user commands to computer executable steps; and
    a natural language dictionary database comprising stored correlations between natural language and computer executable steps.

11. The data handling system of claim 1, wherein the controller sends the at least a portion of the received data via a webhook, message queue, or similar mechanism.

12. A method for data handling comprising:
    receiving, over a wired or wireless network, data at a data ingest module via data receiving hardware circuitry, the data comprising at least one of a data file and a data object;
    comparing the data to a stored tag rule via a tag rules engine using tag rule hardware circuitry to determine if the data should be tagged with a tag;
    tagging the data by storing, on non-transitory computer readable media, an association between the data and the tag;
    comparing the tag to a stored policy via a policy engine using policy hardware circuitry to determine if a policy operation should be performed with respect to the data, wherein the policy operation causes data associated with the tag to be moved from a slow storage device to a faster storage device for a period of time, and then moved back to the slow storage device after the period of time expires;
    identifying when an updated policy is stored to a policy database, the updated policy having a corresponding updated policy operation;
    identifying, by referencing a mapping database, data corresponding to the tag, the mapping database storing, on non-transitory computer readable media, the association between the data and the tag;
    performing the updated policy operation on the data corresponding to the tag;
    sending at least a portion of received data to a client for additional tagging, the client separate from a data handling system;
    receiving the portion of received data from the client with additional tagging; and
    comparing the additional tagging to a second policy to determine if a second policy operation should be performed with respect to the portion of received data.

13. The method of claim 12, further comprising storing the received data on a data storage device.

14. The method of claim 12, further comprising, based on the comparison of the tag to the policy, performing the policy operation.

15. The method of claim 12, wherein the tag rule is a user defined tag rule.

16. The method of claim 12, wherein the policy is a user defined policy.

17. The method of claim 16, wherein the policy relates to at least one of moving the data and storing the data in a predetermined type of storage.

18. A data handling system comprising:
- a data ingest module comprising data receiving hardware circuitry for receiving data comprising at least one of a data file and a data object;
- a tag rules engine comprising tag rules hardware circuitry for comparing the received data to a stored tag rule to determine if the data should be tagged with a tag;
- a policy engine comprising policy hardware circuitry for comparing the tag to a stored policy to determine if a policy operation should be performed with respect to the data, wherein the policy operation causes data associated with the tag to be moved from a slow storage device to a faster storage device for a period of time, and then moved back to the slow storage device after the period of time expires; and
- a mapping database storing, on non-transitory computer readable media, associations between data and tags, wherein the policy engine is to:
  - identify when an updated policy is stored to a policy database, the updated policy having a corresponding updated policy operation;
  - identify by referencing a mapping database, data corresponding to the tag the mapping database storing, on non-transitory computer readable media, the association between the data and the tag;
  - perform the updated policy operation on the data corresponding to the tag;
  - send at least a portion of received data to a client for additional tagging, the client separate from the data handling system,
  - receive the portion of received data from the client with additional tagging; and
  - compare the additional tagging to a second policy to determine if a second policy operation should be performed with respect to the portion of received data.

19. The data handling system of claim 18, further comprising a natural language system comprising:
- a natural language processing engine programmed with computer executable instructions for:
- receiving natural language user commands; and
- converting the user commands to computer executable steps; and
- a natural language dictionary database comprising stored correlations between natural language and computer executable steps.

* * * * *